(12) United States Patent
Hambly et al.

(10) Patent No.: US 10,463,190 B2
(45) Date of Patent: Nov. 5, 2019

(54) BEVERAGE CONTAINER INFUSER APPARATUS

(71) Applicant: Pressa Inc., Elora (CA)

(72) Inventors: Jesse Hambly, Elora (CA); Luke Hambly, Elora (CA)

(73) Assignee: PRESSA INC., Elora, Ontario (CA)

( * ) Notice: Subject to any disclaimer, the term of this patent is extended or adjusted under 35 U.S.C. 154(b) by 535 days.

(21) Appl. No.: 15/230,686

(22) Filed: Aug. 8, 2016

(65) Prior Publication Data
US 2017/0035238 A1     Feb. 9, 2017

Related U.S. Application Data

(60) Provisional application No. 62/202,225, filed on Aug. 7, 2015.

(51) Int. Cl.
*A47J 31/44*     (2006.01)
*A47J 31/00*     (2006.01)

(52) U.S. Cl.
CPC ......... *A47J 31/4403* (2013.01); *A47J 31/005* (2013.01)

(58) Field of Classification Search
CPC .. A47J 31/4403; A47J 31/4407; A47J 31/446; A47J 31/005
See application file for complete search history.

(56) References Cited

U.S. PATENT DOCUMENTS

| | | | | |
|---|---|---|---|---|
| 8,584,576 | B2* | 11/2013 | Fogg, IV | A47J 31/005 99/275 |
| 9,089,239 | B2* | 7/2015 | Billadeau | A47J 31/20 |
| 2011/0048240 | A1* | 3/2011 | Siu | A47J 27/21041 99/285 |
| 2012/0012008 | A1* | 1/2012 | Kwok | A47J 31/0615 99/297 |
| 2014/0224725 | A1* | 8/2014 | Uspenski | A47J 31/005 210/444 |
| 2016/0058235 | A1* | 3/2016 | Blair | A47J 31/20 99/297 |
| 2016/0360918 | A1* | 12/2016 | Chen | A23F 3/18 |
| 2017/0035238 | A1* | 2/2017 | Hambly | A47J 31/005 |
| 2018/0303269 | A1* | 10/2018 | Yakos | A47J 31/005 |

* cited by examiner

*Primary Examiner* — Christopher S Kim
(74) *Attorney, Agent, or Firm* — Miller Thomson LLP; Tai W. Nahm

(57) ABSTRACT

There is disclosed an infuser apparatus for a beverage container. In an embodiment, the apparatus comprises: a perforated basket adapted to receive a flavoring agent therein; a compactor unit sized and shaped to slideably fit inside the perforated basket; a screw operatively connected to the compactor unit and adapted to rotate relative to the compactor unit; and a knob operatively connected to the screw to rotate the screw; whereby, in use, turning the knob actuates the compactor unit to move along the length of the screw to compress the flavoring agent received in the perforated basket, thereby to infuse flavor into the beverage container.

14 Claims, 4 Drawing Sheets

SECTION B-B

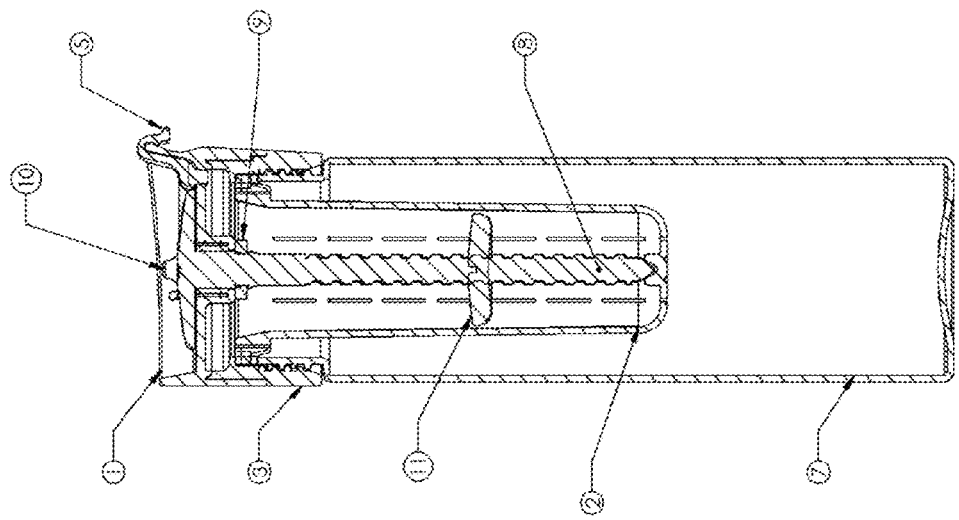
FIG. 4(a)
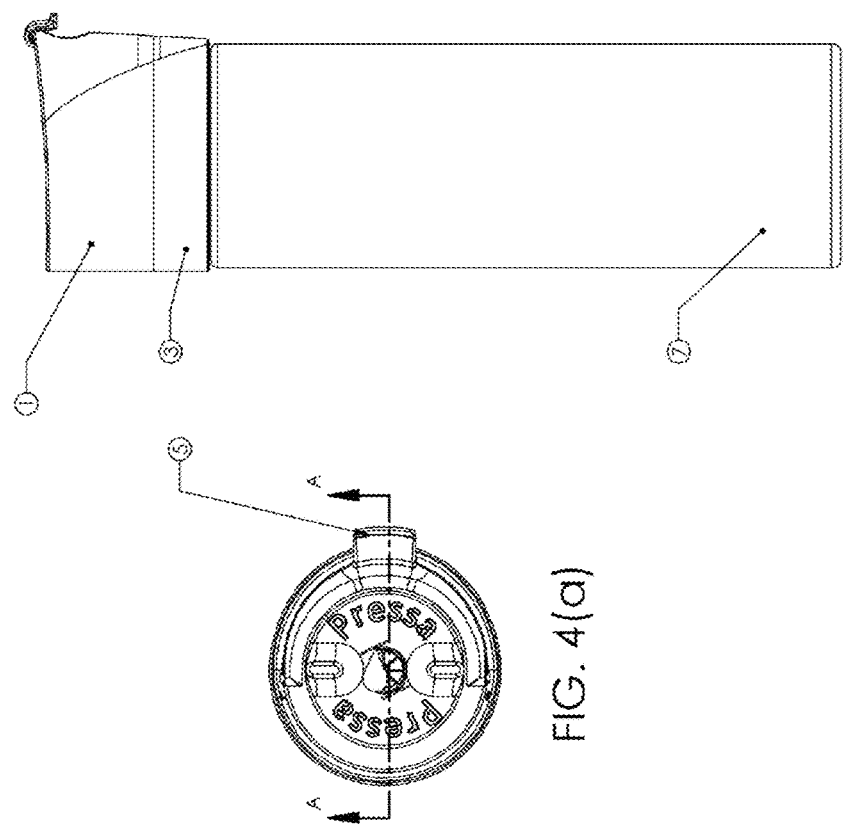
FIG. 4(b)
FIG. 4(c)

BEVERAGE CONTAINER INFUSER APPARATUS

FIELD

The present disclosure relates to an infuser apparatus for a beverage container.

BACKGROUND

Various prior art infusers exist for flavoring beverages contained in beverage containers. Typically, these infusers hold pieces of fruit or other flavoring agents, and impart a desired flavor into the surrounding beverage. However, in many prior art infuser designs, the flavoring agents may not be used to their full extent, and may be thrown out when they may still contain sufficient flavor for a beverage refill, or to impart additional flavor.

What is therefore needed is an improved design which overcomes some of these limitations in the prior art.

SUMMARY

The present disclosure relates to an infuser apparatus for a beverage container.

In an embodiment, the infuser apparatus includes a perforated basket for holding the flavoring agent (e.g. pieces of fresh fruit containing fruit juice), and a compactor unit configured to compress the flavoring agent in the perforated basket in order to extract flavor from the flavoring agent.

In a preferred embodiment, the compactor unit is driven by a screw mechanism operable by manually turning a knob. The compactor unit is sized and shaped to slidably engage the perforated basket, such that the compactor unit remains properly oriented as the screw mechanism is rotated.

In an embodiment, the perforated basket and compactor unit are operatively connected via a main lid body, which may be adapted to snap on or screw onto a generic beverage container, such as a glass or plastic water bottle. The main lid body includes an aperture through which the beverage in the beverage container may be accessed.

In another embodiment, the knob is accessible from the top of the main lid body, such that the compactor unit can be operated to extract more flavor from the flavoring agents at any time.

In another embodiment, the flavoring agent used may be pieces of fruit containing fruit juice, or any other type of flavoring agent that will release flavor upon being compressed.

In another embodiment, the main lid body further includes a hinged snap lid which may be adapted to align with and close over the aperture in the main lid body, thereby hindering or preventing any beverage from escaping the beverage container during transport or storage of the beverage container.

In this respect, before explaining at least one embodiment of the infuser apparatus of the present disclosure in detail, it is to be understood that the present infuser apparatus is not limited in its application to the details of construction and to the arrangements of the components set forth in the following description or illustrated in the drawings. The present infuser apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 4(a) shows a top view of the infuser apparatus of FIG. 3 in accordance with another illustrative embodiment.

FIG. 4(b) shows a side view of the infuser apparatus of FIG. 3 within a generic beverage container in accordance with another illustrative embodiment.

FIG. 4(c) shows a partial cross-sectional view of the infuser apparatus of FIG. 3 within a generic beverage container in accordance with another illustrative embodiment.

DETAILED DESCRIPTION

As noted above, the present disclosure relates to a beverage container infuser apparatus.

In an embodiment, the infuser apparatus includes a perforated basket for holding the flavoring agent (e.g. pieces of fresh fruit containing fruit juice), and a compactor unit configured to compress the flavoring agent against the perforated basket in order to extract flavor from the flavoring agent.

In a preferred embodiment, the compactor unit is driven by a screw mechanism operable by manually turning a knob. The compactor unit is sized and shaped to slidably engage the perforated basket, such that the compactor unit remains properly oriented as the screw mechanism is rotated.

In an embodiment, the perforated basket and compactor unit are operatively connected via a main lid body, which may be adapted to snap on or screw onto a beverage container, such as a glass or plastic water bottle. Preferably, the beverage container is transparent such that the perforated basket and compactor unit can be observed.

The main lid body includes an aperture through which the beverage in the beverage container may be accessed.

In another embodiment, the knob is accessible from the top of the main lid body, such that the compactor unit can be operated to extract more flavor from the flavoring agents at anytime.

In another embodiment, the flavoring agent used may be pieces of fresh fruit containing fruit juice, or any other type of flavoring agent that will release flavor upon being compressed.

In another embodiment, the main lid body further includes a hinged snap lid which may be adapted to align with and close over the aperture in the main lid body, thereby hindering or preventing any beverage from escaping the beverage container during transport or storage of the beverage container.

The infuser apparatus will now be described in more detail with reference to the drawings.

Figure 1:
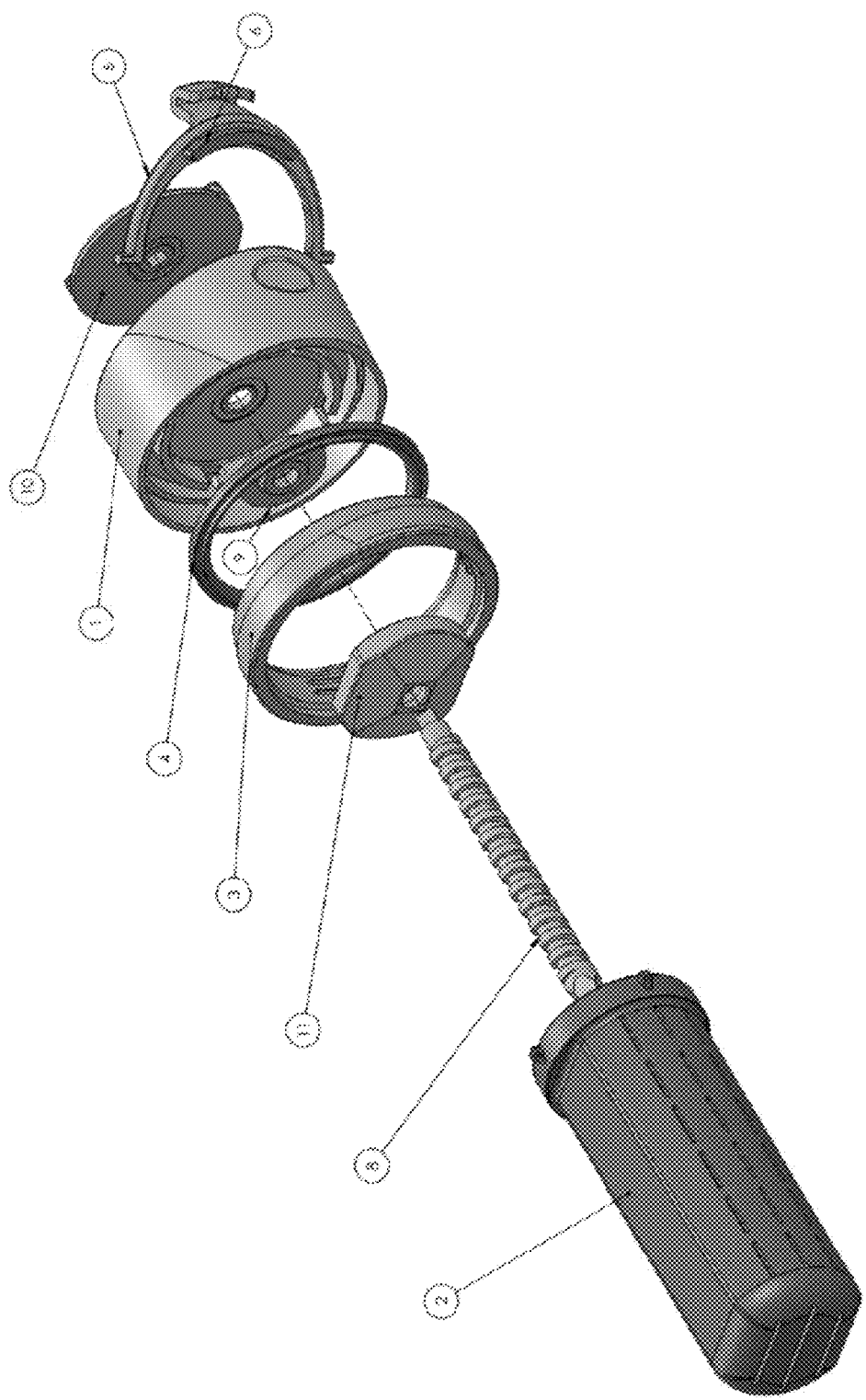
FIG. 1 shows an exploded parts view of an infuser apparatus in accordance with an illustrative embodiment.

Now referring to FIG. 1, shown is an exploded parts view of an infuser apparatus in accordance with an illustrative embodiment. At bottom left is a perforated basket (2) adapted to hold flavoring agents, such as pieces of fruit for example. A compactor unit (11) is sized and shaped to be received within the perforated basket (2) and is adapted to be coupled to a screw (8) via a corresponding threaded hole within the compactor unit (11). Thus, compactor unit (11) is free to move up or down the length of screw (8) when either part is rotated relative to the other.

In an embodiment, the perforated basket (2) includes at least one non-rotational feature which prevents rotation of the compactor unit (11) as the screw (8) rotates relative to the compactor unit (11). In this illustrative example, the non-rotational feature is a flat side which prevents the compactor unit (11) from rotating within the perforated basket (2) as a corresponding flat side of the compactor unit (11) slidingly engages the flat side of the perforated basket (2). However, it will be appreciated that other non-rotational features may be used, such as a slot and corresponding key feature, or any feature which prevents free rotation of the compactor unit (11) relative to the perforated basket (2) as the screw (8) is turned to cause the compactor unit (11) to move up or down the length of the screw (8) within the perforated basket (2).

Figure 2A:
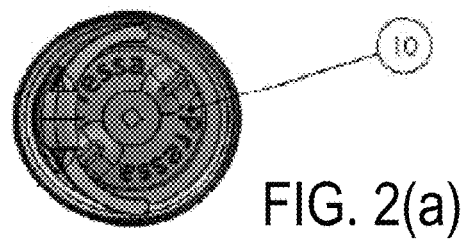
FIG. 2(a) shows a top view of the infuser apparatus in accordance with an illustrative embodiment.
Figure 2D:
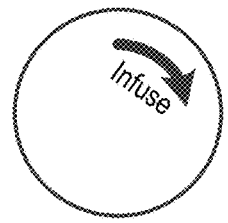
FIG. 2(d) shows an illustrative example of a visual indication of direction of rotation to further infuse.
Figure 2B:
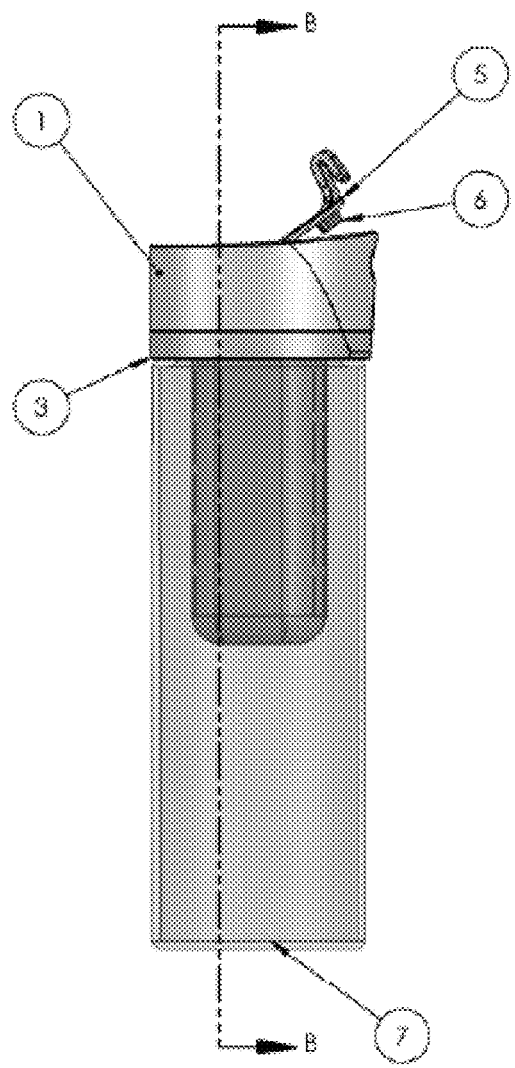
FIG. 2(b) shows a side view of the infuser apparatus within a generic beverage container in accordance with an illustrative embodiment.

Still referring to FIG. 1, a threaded ring (3) is used to mount the infuser apparatus onto a beverage container (see reference numeral 7 in FIG. 2(b)), such as a glass or plastic water bottle, for example. A bottle sealing gasket (4) provides a liquid tight seal between the infuser apparatus and the beverage container. A main lid body (1) is coupled to the threaded ring (3), and provides a mounting surface for mounting a screw top (9) to fasten to a screw (8). On the opposite side of the main lid body (1) is a screw knob (10) which is manually operable to turn the screw (8).

Optionally, a sealing snap lid (5) is attached to the main lid body (1) by hinges to allow the sealing snap lid to be rotated into position to cover an aperture in the main lid body (1) using a snap lid tapered seal (6).

Figure 2C:
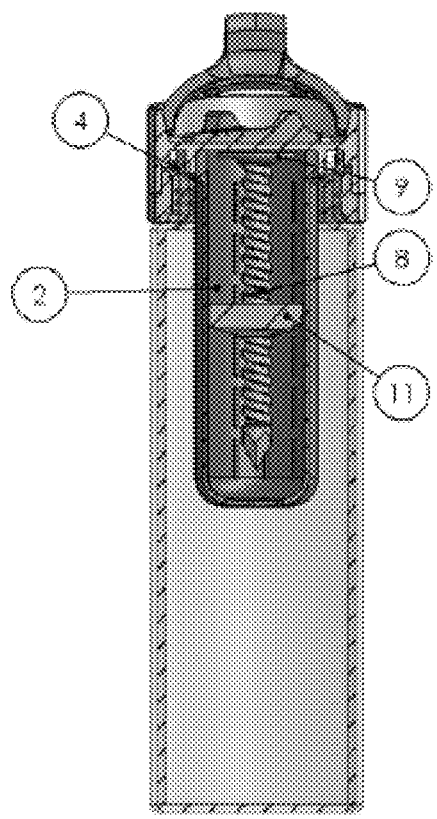
FIG. 2(c) shows a partial cross-sectional view of the infuser apparatus within a generic beverage container in accordance with an illustrative embodiment.

Now referring to FIGS. 2(a) to 2(c), shown is the illustrative infuser apparatus of FIG. 1 assembled for use with a generic beverage container (7). More particularly, FIG. 2(a) shows a top view of the infuser apparatus in accordance with an illustrative embodiment. Here, the sealing snap lid (5) is shown in position hinged to the main lid body (1).

FIG. 2(b) shows a side view of the infuser apparatus within a generic beverage container (7) in accordance with an illustrative embodiment. FIG. 2(c) shows a corresponding partial cross-sectional view of the infuser apparatus mounted to the generic beverage container. In this view, the infuser apparatus is fully assembled, and the compactor unit (11) is shown mounted on the screw (8). As the screw (8) is turned by manually operating the knob (10), the compactor unit (11) compresses a flavoring agent (e.g. pieces of fresh fruit) against the perforated basket (2) to allow the flavor to be infused into the beverage in the beverage container (7).

In use, depending on the direction of the thread on the screw (8) and on the threaded hole in the compactor unit (11), rotation in one direction will cause the compactor unit (11) to move down the threaded length of the screw (8) to compress any flavoring agents between the compactor unit (11) and the perforated basket (2).

In an embodiment, the proper direction of rotation of the knob (10) to further compress the flavoring agent may be visually marked on the knob (10) itself, or on the top of the main lid body (1) to alert the user. For example, as illustrated in FIG. 2(d), an arrow on the top of the main lid body (1) pointing in a clockwise direction may be labeled as "Flavor" or "Infuse", or some other similar label.

Periodic repeated operation of the knob in the appropriate direction to further compress the flavoring agent allows the infuser apparatus to extract substantially all of the flavor (e.g. fruit juice) from the flavoring agent before the flavoring agent needs to be replaced.

Rotation in the opposite direction will cause the compactor unit (11) to move up the length of the screw (8) to withdraw back from the bottom of the perforated basket (2) to allow the spent flavoring agent to be replaced.

In an embodiment, the perforated basket (2) is at least partly or wholly transparent or translucent, such that the position of the compactor unit (11) within the perforated basket (2) can be observed, and visual confirmation may also be provided as the compactor unit (11) nears the bottom end of the screw (8) until the flavoring agent is substantially compressed to its limit.

Figure 3:
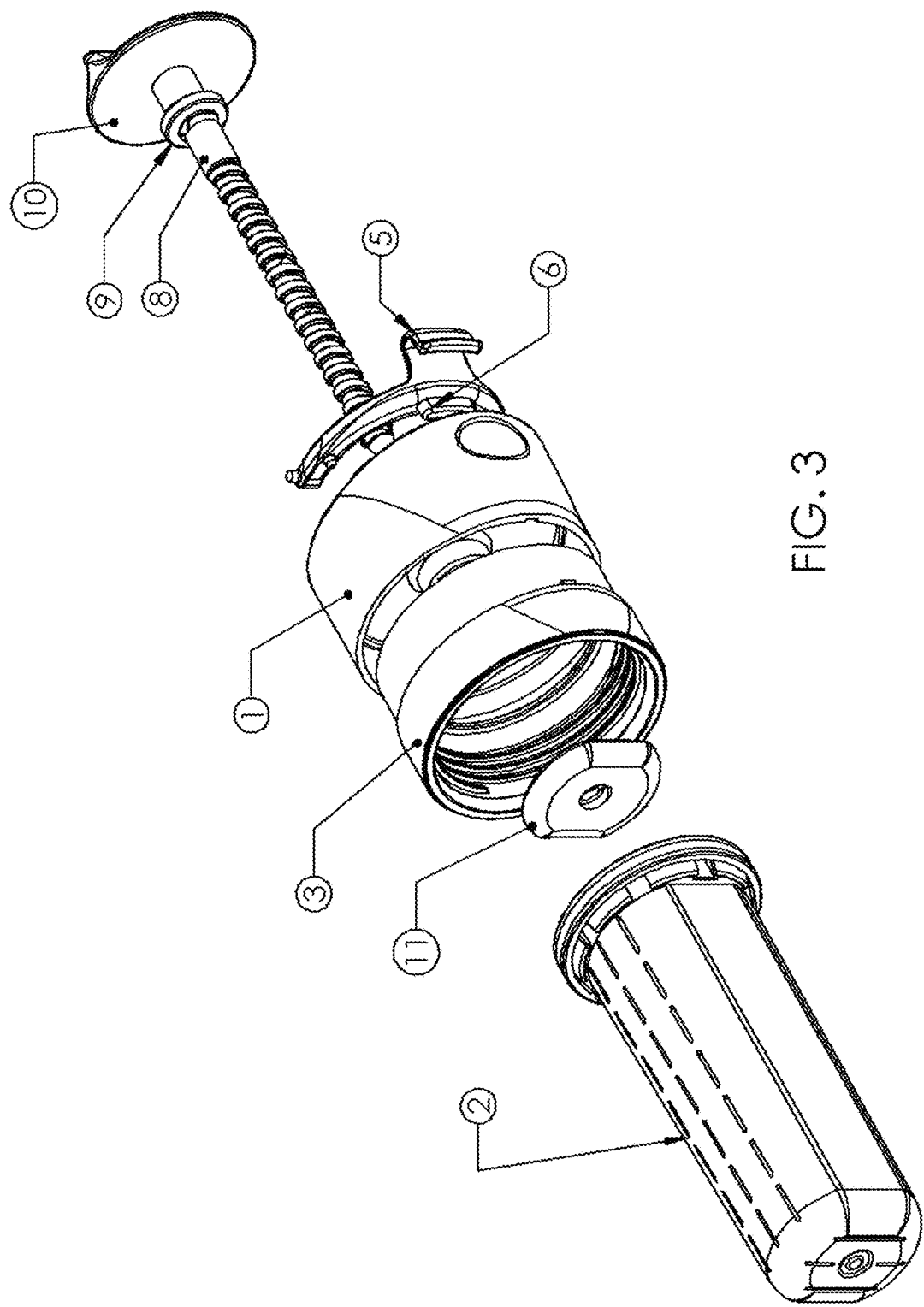
FIG. 3 shows an exploded parts view of an infuser apparatus in accordance with another illustrative embodiment.

Now referring to FIG. 3, shown is an exploded parts view of an infuser apparatus in accordance with another illustrative embodiment. In FIG. 3, corresponding parts are labeled with the same reference numerals as in FIG. 1. However, in FIG. 3, the screw knob (10), screw top (9) and screw (8) are combined into one integral piece, thus simplifying manufacture and assembly in comparison to the embodiment shown in FIG. 1. In addition, the sealing gasket (4) is now integrated as a sealing mold directly on the top edge of the perforated basket (2). This again reduces the number of parts that need to be assembled.

FIGS. 4(a) to 4(c) show corresponding assembled views of the infuser apparatus of FIG. 3, including FIG. 4(c) which shows a cross-sectional view of the infuser apparatus of FIG. 3. Corresponding parts are labeled with the same reference numerals as in FIGS. 2(a) to 2(c) described earlier, with the changes as noted with reference to FIG. 3.

While two illustrative embodiments of the infuser apparatus are shown and described, it will be appreciated that various other modifications may be made to the infuser apparatus, for example to change various other the details of the main lid body (1) and the mounting configuration for the screw (8), screw top (9), and screw knob (10) to the main lid body (1).

Thus, in an aspect, there is provided an infuser apparatus for a beverage container, comprising: a perforated basket adapted to receive a flavoring agent therein; a compactor unit sized and shaped to slidably fit inside the perforated basket; a screw operatively connected to the compactor unit and adapted to rotate relative to the compactor unit; and a knob operatively connected to the screw to rotate the screw; whereby, in use, turning the knob actuates the compactor unit to move along the length of the screw to compress the flavoring agent received in the perforated basket, thereby to infuse flavor into the beverage container.

In an embodiment, the compactor unit includes a non-rotational feature which prevents free rotation of the compactor unit within the perforated basket.

In another embodiment, the non-rotational feature included in the compactor unit comprises at least one flat side corresponding to a flat side in the perforated basket.

In another embodiment, the screw has a threaded length adapted to allow the compactor unit to travel up and down substantially the length of the perforated basket.

In another embodiment, the perforated basket is at least partly or wholly transparent or translucent, such that the position of the compactor unit within the perforated basket can be observed.

In another embodiment, the perforations in the perforated basket are provided along the entire length of the basket.

In another embodiment, the perforated basket and the compactor unit are operatively connected via a main lid body adapted to snap on or screw onto a generic beverage container.

In another embodiment, wherein the main lid body further comprises a sealing gasket to seal the main lid body against a generic beverage container.

In another embodiment, the main lid body is adapted to be coupled or decoupled from a threaded ring.

In another embodiment, the main lid body includes an aperture through which the beverage in the beverage container may be accessed.

In another embodiment, the main lid body further includes a hinged snap lid which may be adapted to align with and close over the aperture in the main lid body, thereby hindering or preventing any beverage from escaping the beverage container during transport or storage of the beverage container.

In another embodiment, the knob is accessible from the top of the main lid body, such that the compactor unit can be operated to extract more flavor from the flavoring agents at any time.

In another embodiment, the proper direction of rotation of the knob to further compress the flavoring agent may be visually marked on the knob itself, or on the top of the main lid body.

In another embodiment, the flavoring agent used may be pieces of fruit containing fruit juice, or any other type of flavoring agent that will release flavor upon being compressed.

While illustrative embodiments of the invention have been described above, it will be appreciate that various changes and modifications may be made without departing from the scope of the present invention.

The invention claimed is:

1. An infuser apparatus for a beverage container, comprising:
   a perforated basket adapted to receive a flavoring agent therein;
   a compactor unit sized and shaped to slideably fit inside the perforated basket;
   a screw operatively connected to the compactor unit and adapted to rotate relative to the compactor unit; and
   a knob operatively connected to the screw to rotate the screw;
   whereby, in use, turning the knob actuates the compactor unit to move along the length of the screw to compress the flavoring agent received in the perforated basket, thereby to infuse flavor into the beverage container.

2. The infuser apparatus of claim 1, wherein the compactor unit includes a non-rotational feature which prevents free rotation of the compactor unit within the perforated basket.

3. The infuser apparatus of claim 2, wherein the non-rotational feature included in the compactor unit comprises at least one flat side corresponding to a flat side in the perforated basket.

4. The infuser apparatus of claim 1, wherein the screw has a threaded length adapted to allow the compactor unit to travel up and down substantially the length of the perforated basket.

5. The infuser apparatus of claim 1, wherein the perforated basket is at least partly or wholly transparent or translucent, such that the position of the compactor unit within the perforated basket can be observed.

6. The infuser apparatus of claim 1, wherein the perforations in the perforated basket are provided along the entire length of the basket.

7. The infuser apparatus of claim 1, wherein the perforated basket and the compactor unit are operatively connected via a main lid body adapted to snap on or screw onto a generic beverage container.

8. The infuser apparatus of claim 7, wherein the main lid body further comprises a sealing gasket to seal the main lid body against a generic beverage container.

9. The infuser apparatus of claim 7, wherein the main lid body is adapted to be coupled or decoupled from a threaded ring.

10. The infuser apparatus of claim 7, wherein the main lid body includes an aperture through which the beverage in the beverage container may be accessed.

11. The infuser apparatus of claim 7, wherein the main lid body further includes a hinged snap lid which may be adapted to align with and close over the aperture in the main lid body, thereby hindering or preventing any beverage from escaping the beverage container during transport or storage of the beverage container.

12. The infuser apparatus of claim 7, wherein the knob is accessible from the top of the main lid body, such that the compactor unit can be operated to extract more flavor from the flavoring agents at any time.

13. The infuser apparatus of claim 12, wherein the proper direction of rotation of the knob to further compress the flavoring agent may be visually marked on the knob itself, or on the top of the main lid body.

14. The infuser apparatus of claim 1, wherein the flavoring agent used may be pieces of fruit containing fruit juice, or any other type of flavoring agent that will release flavor upon being compressed.

* * * * *